United States Patent [19]

Hashimoto et al.

[11] Patent Number: 4,857,413
[45] Date of Patent: Aug. 15, 1989

[54] METAL-MADE CARRIER BODY FOR EXHAUST GAS CLEANING CATALYST

[75] Inventors: Yasuaki Hashimoto; Haruo Serizawa, both of Shizuoka, Japan

[73] Assignee: Usui Kokusai Sangyo Kabushiki Kaisha, Japan

[21] Appl. No.: 289,022

[22] Filed: Dec. 23, 1988

[30] Foreign Application Priority Data

Dec. 28, 1987 [JP] Japan .............................. 62-197358[U]

[51] Int. Cl.$^4$ ........................... B01J 35/04; F01N 3/28
[52] U.S. Cl. ................................... 428/592; 428/593; 428/603; 502/439; 502/527
[58] Field of Search ................ 428/592, 593, 603, 608; 502/439, 527; 422/180

[56] References Cited

U.S. PATENT DOCUMENTS

| | | | |
|---|---|---|---|
| 2,761,203 | 9/1956 | De Witt | 428/603 |
| 4,282,186 | 8/1981 | Nonnenmanor et al. | 422/180 |
| 4,374,803 | 2/1983 | Fratzer et al. | 422/180 |
| 4,598,063 | 7/1986 | Refallick | 428/593 |
| 4,600,562 | 7/1986 | Vink et al. | 422/180 |
| 4,719,680 | 1/1988 | Cyron | 428/593 |

FOREIGN PATENT DOCUMENTS

| | | | |
|---|---|---|---|
| 270856 | 6/1988 | European Pat. Off. | 502/527 |
| 146216 | 11/1980 | Japan . | |
| 47374 | 10/1982 | Japan . | |
| 63-36841 | 2/1988 | Japan | 502/527 |
| 63-36842 | 2/1988 | Japan | 502/527 |
| 2063092A | 6/1981 | United Kingdom | 422/180 |

*Primary Examiner*—John J. Zimmerman
*Attorney, Agent, or Firm*—Lowe, Price, LeBlanc, Becker & Shur

[57] ABSTRACT

A metal-made carrier body is provided for an exhaust gas cleaning catalyst. The carrier body includes a cylindrical metal casing and a metal-made multi-layered composite body. The composite body has been obtained by superposing one over the ther at least one planar metal band made of a thin metal sheet and at least one corrugated metal band made of another thin metal sheet and then rolling both the bands together into a spiral form, so that the composite body defines many network-patterned gas flow passages along the central axis thereof. The composite body is enclosed within the metal casing. A gas-permeable insert is centrally and axially embedded within the multi-layered composite body of the planar metal band and the corrugated metal band.

4 Claims, 2 Drawing Sheets

METAL-MADE CARRIER BODY FOR EXHAUST GAS CLEANING CATALYST

BACKGROUND OF THE INVENTION (1) Field of the Invention:

This invention relates to a metal-made carrier body for an exhaust gas cleaning catalyst which is generally interposed as an exhaust gas cleaning means at an intermediary point in an exhaust gas system of an automotive vehicle. More specifically, this invention is concerned with a metal-made carrier body for an exhaust gas cleaning catalyst, which can improve the efficiency of contact between an exhaust gas and a catalyst layer to enhance the cleaning efficiency of the exhaust gas.

(2) Description of the Related Art:

As metal-made carrier bodies for carrying an exhaust gas cleaning catalyst, there have conventionally been known those obtained by rolling at least one planar metal band and at least one corrugated metal band, each of said bands being made of a thin metal sheet, together into a spiral form with a view toward increasing the carrying area per unit volume, in other words, increasing the effective contact area between an exhaust gas and an exhaust gas cleaning catalyst as much as possible and further with a view toward reducing the weight of the metal-made carrier body as much as feasible. For example, a planar band of a heat-resistant thin iron-chromium steel sheet of 0.1 mm thick or less and a corrugated band obtained by forming into a corrugated configuration a thin steel sheet of the same type as that mentioned above are superposed one over the other to establish contacts therebetween. They are then rolled together into a spiral form, thereby providing a multi-layered composite body defining many network-patterned gas flow passages along the central axis thereof. The thus-rolled multi-layered composite body is enclosed in a metal casing which is open at both ends thereof. The contacts between the planar band and corrugated band and contacts between these bands and the metal casing are bonded by welding, brazing or the like.

As has been described above, a metal-made carrier body for supporting an exhaust gas cleaning catalyst thereon is fabricated by rolling a planar metal band and a corrugated metal band, each of said bands being made of a thin metal sheet, together into a spiral form. In its fabrication process, the rolling is effected using a metal-made mandrel of, for example, about 3-6 mm in diameter as a core and the mandrel is thereafter extracted.

Accordingly, the multi-layered spiral composite body of the planar metal band and corrugated metal band always defines a central and axial bore corresponding to the mandrel in view of its fabrication process.

When an exhaust gas cleaning catalyst such as platinum, palladium or rhodium is carried on the metal-made carrier body having such a central and axial bore in its rolled multi-layered composite body and is then used as a catalytic converter, a portion of an exhaust gas is allowed to pass through the central and axial bore so that the cleaning performance is reduced to a significant extent.

SUMMARY OF THE INVENTION

An object of this invention is therefore to provide a metal-made carrier body imparted with cleaning ability for an exhaust gas even at the central and axial bore formed unavoidably in the abovedescribed fabrication process of the metal-made carrier body, so that the metal-made carrier body has excellent cleaning ability for the exhaust gas.

In one aspect of this invention, there is thus provided a metal-made carrier body for an exhaust gas cleaning catalyst. The carrier body includes a cylindrical metal casing and a metal-made multi-layered composite body. The composite body has been obtained by superposing one over the other at least one planar metal band made of a thin metal sheet and at least one corrugated metal band made of another thin metal sheet and then rolling both the bands together into a spiral form, so that the composite body defines many network-patterned gas flow passages along the central axis thereof. The composite body is enclosed within the metal casing. A gas-permeable insert is centrally and axially embedded within the multi-layered composite body of the planar metal band and the corrugated metal band.

The metal-made carrier body according to this invention, which is suitable for use in carrying an exhaust gas cleaning catalyst, is provided with the gas-permeable insert embedded in the central and axial bore formed unavoidably upon rolling the planar metal band and corrugated metal band, each of said bands being made of a thin metal sheet, together into a spiral form. Owing to the provision of the gas-permeable insert, the metal-made carrier body according to this invention can exhibit the following superb effects.

(i) By the provision of the gas-permeable insert in the central and axial bore, the amount of an exhaust gas which would otherwise be emitted without contact to an associated exhaust gas cleaning catalyst can be reduced.

(ii) By having the gas-permeable insert, which is provided in the central and axial bore, also carry the exhaust gas cleaning catalyst, the overall cleaning performance can be improved.

(iii) The metal-made carrier body can be fabricated smaller and lighter compared with conventional metal-made carrier bodies, because the cleaning efficiency of the exhaust gas can be enhanced as an eventual advantage.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF PREFERRED EMBODIMENT

Figure 1:
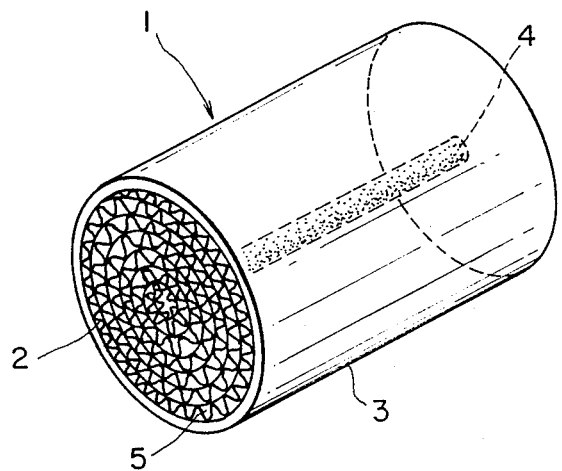
FIG. 1 is a partly-see through, overall perspective view of a metal-made carrier body according to one embodiment of this invention, which is suitable for carrying an exhaust gas cleaning catalyst thereon.

As is apparent from FIG. 1, the metal-made carrier body generally indicated at numeral 1, which is suitable for carrying an exhaust gas cleaning catalyst, is composed of a multi-layered composite body 2, a metal-made casing 3 and a gas-permeable insert 4 embedded in a central and axial bore of the multi-layered composite body 2. The multi-layered composite body 2 has been formed by superposing a planar band and a corrugated band, each of said bands being made of a thin iron-chromium metal sheet, one over the other and then rolling them together into a spiral form. FIG. 1 also shows many network-patterned gas flow passages 5 along the central axis of the multi-layered composite body 2.

In the present invention, as the gas-permeable insert 4, a stainless steel mesh formed by interweaving metal wires having a diameter of 0.03–0.5 mm (10–100 mesh), stainless steel wool (wire diameter: 30–100 $\mu$m), a corrugated band of a thin metal sheet or the like can be used by way of example. The gas-permeable insert 4 may be used in a rod-like or cylindrical form, so that it may serve as a mandrel upon fabrication of the multi-layered composite body 2 by rolling the planar band and corrugated band, each of said bands being made of a thin metal sheet, together into a spiral form. In this case, the gas-permeable insert 4 can be embedded as a unitary member centrally and axially within the multi-layered composite body 2. As an alternative, the multi-layered composite body 2 is first formed by rolling a planar band and a corrugated band, each of said bands being made of a thin metal plate, together into a spiral form about a metal-made mandrel. After extracting the mandrel, the gas-permeable insert 4 may be inserted and embedded in the resultant central and axial bore of the multi-layered composite body 2. The gas-permeable insert 4 and multi-layered composite body 2 are thereafter bonded together by welding, brazing or the like, whereby a metal-made carrier body free of any central and axial bore in the multi-layered composite body 2 is provided for carrying an exhaust gas cleaning catalyst thereon.

Figure 2:
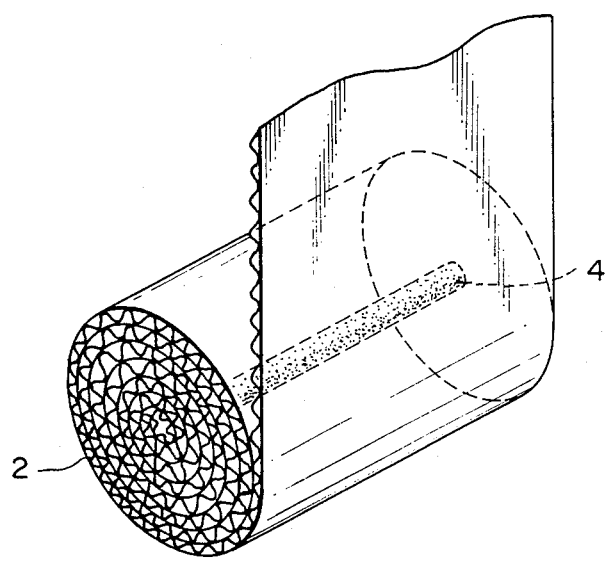
FIG. 2 is a schematic illustration showing a manner of fabrication of the metal-made carrier body of this invention for the exhaust gas cleaning catalyst.
Figure 3:
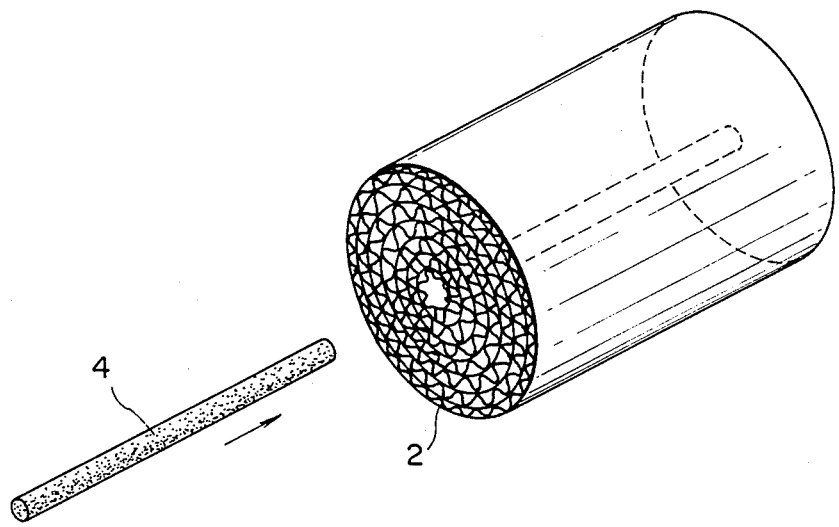
FIG. 3 is a schematic illustration showing another manner of fabrication of the metal-made carrier body of this invention for the exhaust gas cleaning catalyst.

Referring next to FIGS. 2 and 3, the fabrication of the metal-made carrier body according to this invention will be described.

In the fabrication manner illustrated in FIG. 2, the gas-permeable insert 4 is used after shaping it into a rod-like or cylindrical form in advance, so that the gas-permeable insert 4 can be used as a mandrel when a planer metal band and a corrugated metal band, each of said bands being made of a thin metal sheet, are rolled together into a spiral form subsequent to their superposition. In this manner, the gas-permeable insert 4 can be united with the multi-layered composite body 2 at the same time as the multi-layered composite body 2 is formed.

In the fabrication manner depicted in FIG. 3, the multi-layered composite body 2 is formed in advance by the aforementioned rolling method. A metal-made mandrel employed in the rolling operation is then extracted, followed by insertion of the gas-permeable insert 4 into the resultant central and axial bore o the multi-layered composite body 2.

We claim:

1. In a metal-made carrier body for an exhaust gas cleaning catalyst, including a cylindrical metal casing and a metal-made multi-layered composite body obtained by superposing one over the other at least one planar metal band made of a thin metal sheet and at least one corrugated metal band made of another thin metal sheet and then rolling both the bands together into a spiral form, defining many network-patterned gas flow passages along the central axis thereof and enclosed within the metal casing, the improvement wherein a gas-permeable insert is centrally and axially embedded within the multi-layered composite body of the planar metal band and the corrugated metal band.

2. The metal-made carrier body as claimed in claim 1, wherein the embedded gas-permeable insert is a stainless mesh formed in the shape of a rod.

3. The metal-made carrier body as claimed in claim 1, wherein the embedded gas-permeable insert is stainless wool formed in the shape of a rod.

4. The metal-made carrier body as claimed in claim 1, wherein the embedded gas-permeable insert is a corrugated band of a thin metal sheet, which has been formed into the shape of a cylinder.

* * * * *